(12) United States Patent
Tseng

(10) Patent No.: US 8,195,194 B1
(45) Date of Patent: Jun. 5, 2012

(54) ALARM FOR MOBILE COMMUNICATION DEVICE

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/938,059

(22) Filed: Nov. 2, 2010

(51) Int. Cl.
*H04W 24/00* (2009.01)

(52) U.S. Cl. .................. 455/456.1; 368/10; 455/566

(58) Field of Classification Search .............. 368/10–14; 455/566, 456.3
See application file for complete search history.

(56) References Cited

U.S. PATENT DOCUMENTS

| | | | | |
|---|---|---|---|---|
| 2008/0102786 | A1* | 5/2008 | Griffin | 455/404.2 |
| 2008/0214210 | A1* | 9/2008 | Rasanen et al. | 455/456.3 |
| 2008/0318616 | A1* | 12/2008 | Chipalkatti et al. | 455/550.1 |
| 2009/0163182 | A1* | 6/2009 | Gatti et al. | 455/414.1 |
| 2009/0284389 | A1* | 11/2009 | Klassen et al. | 340/825.22 |
| 2009/0288022 | A1* | 11/2009 | Almstrand et al. | 715/762 |
| 2009/0316671 | A1* | 12/2009 | Rolf et al. | 370/338 |

* cited by examiner

*Primary Examiner* — Vladimir Magloire
(74) *Attorney, Agent, or Firm* — Fish & Richardson P.C.

(57) ABSTRACT

A user may rely on an alarm application on the wireless device. Oftentimes, users interface with an alarm application to ensure that the user alerted to certain information or awake at certain times. The alarm application may be configured to automatically surface various information upon activation of the alarm. User interest in a particular subject or piece of information may vary depending on the user's environment. For example, a user waking up at home may find it useful to review news traffic and weather. In contrast, a business traveler may be interested in a flight status, taxi availability, and information related to travel plans. In order to better serve a user, the wireless device may be configured to support various configurations responsive to a user's environment so that a user at home receives home environmental information and a business traveler receives travel environmental information.

19 Claims, 7 Drawing Sheets

ALARM FOR MOBILE COMMUNICATION DEVICE

TECHNICAL FIELD

This document generally relates to alarm applications for mobile communication devices such as smartphones.

BACKGROUND

Communications networks, such as the Internet, provide access to a vast library of content. For instance, communications networks may be leveraged by media players on personal computers to access and render audio and video programming. The interactive nature of the content sources and communications networks enables many users to select, access, or leverage a specified content selection from the vast library of content at a time desired by the user. Mobile communication and computing devices have increased in power and in the richness of applications that they can provide to users.

Many mobile devices, including smartphones, include clock and alarm clock application, and other applications, or apps, may be added to certain smartphone platforms. These alarm clocks may be set to wake a user of a device, including when the user is traveling and needs to wake for a flight when staying inn a hotel room. A user of an alarm application may also be allowed to change the appearance of the application, such as by switching between analog and digital clock representations.

SUMMARY

This document discusses systems and techniques that may be used to change the behavior of an alarm clock on a mobile computing device, such as a tablet computer or smartphone, depending on the geographical location of the device. For example, a device alarm may perform in one manner when the device is determined to be in its user's home, and in another manner when it determines that the user is traveling and away from home. For example, if the user's home is San Francisco and the user frequently travels to Boston and New York for business trips, an alarm may be set to wake the user at different times based on the times when the user's day typically starts in such locations. For example, the Boston client may schedule early morning meetings, so that the alarm may be set for 6 a.m. as a default when the user is in the Boston area, while the alarm may be set for 8 a.m. in the New York area (to reflect a client who has later meetings, and to reflect the fact that the user would be getting up at 5 a.m. in his home time). Also, the timing on the alarm may vary after a user arrives at an "away" location, such as by being set slightly later the first day the user is in Boston (to address jet lag issues) and to be set earlier on subsequent days of a trip.

Also, the categories of information displayed on an "alarm" or "clock" screen of a user's device may change based on whether the user is determined to be at home or somewhere else. For example, while local sports scores may be displayed adjacent the current time when the user is at home, such information may be replaced by travel information such as the flight status of a flight on which the user is scheduled to travel later in the day. Such flight information may be obtained from the user's schedule, and/or by accessing an account at an airline where the user is a registered member, or via a third-party service that has access to flight schedule information.

In certain implementations, a user may be required to answer a question (including verbally) or solve a puzzle in order to stop the activation of an alarm—i.e., the alarm might only enter a "snooze" mode until the user can answer the question or solve the puzzle so as to turn off the alarm. For example, a device may play a sentence to the user and the user may be required to repeat the sentence in a clear enough voice so that a speech recognition system can understand the user, so as to indicate that the user is not still groggy. Also, the device may stay active (e.g., in a snooze mode) until GPS or other technology such as a gyroscope has determine that the device has been moved a certain distance (e.g., more than 15 feet) so as to indicate that the user is standing and ambulatory, and thus less likely to fall back asleep. The device may also require the presence of a noise, such as running water to indicate that the user has stood and moved into a bathroom to operate a bathroom sink.

In one implementation, a method for presenting information to a user of a mobile computing device is disclosed. The method comprises enabling a user to invoke an alarm application that includes (a) a home configuration that presents home environmental information supportive of the user as a result of determining that the user is located in a home environment, and (b) a travel configuration that presents travel environmental information supportive of the user as a result of determining that the user is located in a travel environment. The method also comprises receiving a user instruction to invoke the alarm application in a specified circumstance, determining whether the user is located in the home environment or the travel environment, and based on determining whether the user is located in the home environment or the travel environment: loading the home configuration, and accessing home environmental information required to present the home configuration, or loading the travel configuration, and accessing travel environmental information required to present the travel configuration. In addition, the method includes activating the alarm application automatically in response to detecting the specified circumstance, and presenting the home environmental information if the home configuration has been loaded, or the travel environmental information if the travel configuration has been loaded.

In some aspects, determining whether the user is located in the home environment or the travel environment includes monitoring user interaction with wireless user device that does not include an explicit selection by the user of a home environment or a travel environment, determining whether the user interaction with the wireless device is indicative of whether the user is in home environment or whether the user is in the travel environment, and using the determination of whether the user interaction with the wireless device is indicative of whether the user is in home environment or whether the user is in the travel environment to configure the alarm application to load the home configuration or the travel configuration. Moreover, determining whether the user interaction with the wireless device is indicative of whether the user is in home environment or whether the user is in the travel environment can include determining whether the user is requesting previously-accessed information determined to be associated with the home environment or the travel environment.

In other aspects, determining whether the user interaction with the wireless device is indicative of whether the user is in home environment or whether the user is in the travel environment includes determining whether the user is requesting not-previously-accessed information determined to be associated with a new location that is different than the home location. In addition, receiving the user instruction to invoke the alarm application in the specified circumstance can include receiving a user request to generate an alarm at a specified time, or can include receiving a user request to generate an alarm in response to receiving a specified message. Also, determining whether the user is located in the home environment or the travel environment can include using a global positioning system receiver or a network address to determine a geographic location for the mobile computing device, comparing the determined geographic location relative to prior travel patterns, and determining, based on the comparison of the location relative to prior travel patterns, whether the user is located in the home environment or the travel environment.

In yet other aspects, accessing home environmental information required to present the home configuration includes monitoring user interaction with the wireless device, identifying, based on monitoring user interaction with wireless device, home environmental information determined to be useful when activating the alarm application in the home configuration, and prompting the user to confirm that the home environmental information should be presented when activating the alarm application. Also, accessing home environmental information required to present the home configuration can include monitoring user interaction with the wireless device, identifying, based on monitoring user interaction with wireless device, the home environmental information determined to be useful when activating the alarm application in the home configuration, and modifying the home configuration to automatically include the home environmental information without prompting the user.

In other aspects, presenting the home environmental information includes presenting traffic information for a commuter route for the user from a home of the user to a workplace of the user, and presenting the travel environmental information includes presenting airline flight information for the user.

In another implementation, a method for presenting information to a user of a mobile computing device is discussed. The method comprises determining that an alarm should be presented on the mobile computing device, determining whether the mobile computing device is located at or near a home of the user of the mobile computing device or away from the home of the user of the mobile computing device, selecting an alarm configuration based on the determination of whether the mobile computing device is located at or near a home of the user of the mobile computing device or away from the home of the user of the mobile computing device, and causing the alarm to be presented according to the selected alarm configuration. Moreover, determining that an alarm should be presented on the mobile computing device can comprise selecting a time for causing the alarm to be presented based on the selecting of the alarm configuration. In addition, the time for causing the alarm to be presented can be different depending on whether the device is determined to be at or near the home of the user, or away from the home of the user. In addition, causing the alarm to be presented according to the selected alarm configuration can comprise causing a plurality of modules to be displayed, the plurality of modules having been selected by the user to correspond to the selected alarm configuration.

In certain aspects, determining whether the computing device is located at or near a home of the user comprises comparing a current geographic location of the mobile computing device to a location at which the mobile computing device has been determined to be most frequently located. Also, causing the alarm to be presented according to the selected alarm configuration can comprise obtaining from a hosted computer service remote from the mobile computing device, real-time data that represents a current condition in a geographic area around the mobile computing device.

In yet another implementation, a tangible non-transitory recordable storage medium has recorded therein instructions. The instructions, when executed, perform actions that comprise determining that an alarm should be presented on the mobile computing device, determining whether the mobile computing device is located at or near a home of the user of the mobile computing device or away from the home of the user of the mobile computing device, selecting an alarm configuration based on the determination of whether the mobile computing device is located at or near a home of the user of the mobile computing device or away from the home of the user of the mobile computing device, and causing the alarm to be presented according to the selected alarm configuration.

The details of one or more embodiments are set forth in the accompanying drawings and the description below. Other features, objects, and advantages will be apparent from the description and drawings, and from the claims.

DETAILED DESCRIPTION

Figure 1:
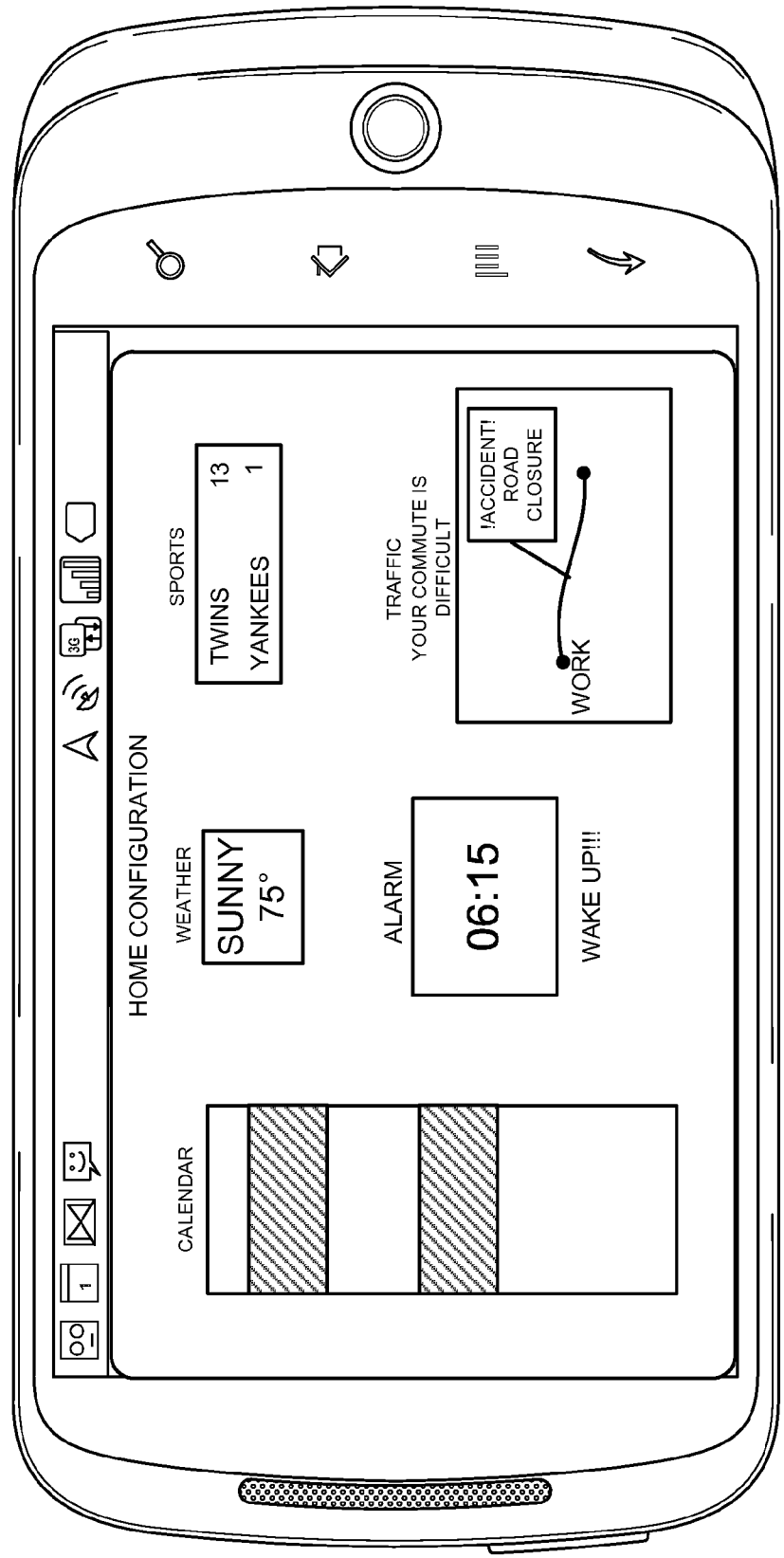
FIG. 1 is a user interface of a display for an alarm application that presents home environmental information in response to determining that the user is located in the home environment.

Users increasingly rely on their wireless devices to perform a variety of tasks and functions. As ever increasing amounts of useful information become accessible through various services, a user can navigate through the services to retrieve information that is of interest to them. A user with a wireless telephone or other wireless device like a slate or tablet, may navigate various services to retrieve real-time actionable intelligence. For example, a business traveler may access flight information and a commuter may access traffic information.

The user experience on wireless devices may be enhanced by minimizing the work required to access the actionable intelligence. Some users may find that the value of the information is not justified by the amount of time and work required to navigate to the various services. The burden of navigating to various resources may become even profound if the user has limited time with which to retrieve the information. In response to these pressures, a wireless devices may be configured to automatically surface the "right" information at the right times in order to make the desired information more easily accessible. The value of automatically surfacing useful information may be increased if the wireless device can rely on various factors to indicate that it is an opportune moment to automatically surface the useful information.

For example, a user may employ an alarm application on his or her wireless device that causes the device to beep at a prescribed time or times during the day. Oftentimes, a user employs an alarm application to ensure that he or she is alerted to certain information or awake at certain times. Particularly when a user first awakes in the morning, time can be critical and the user may have limited time with which to prepare for the day. Thus, the alarm application may be configured to automatically display various pre-defined information when the alarm is activated (e.g., in response to activating a 6 a.m. wake up). User interest in a particular subject or piece of information may vary depending on the user's environment. For example, a user waking up at home may find it useful to review news, traffic, and weather-related information. In contrast, a business traveler may be interested in a flight status, taxi availability, information about restaurants, cafes, and coffee shops in an area, and information related to travel plans. In order to better serve a user, the wireless device may be configured to support various configurations that are responsive to a user's geographic environment so that a user at home receives home environmental information and a business traveler receives travel environmental information. In certain implementations, such information may momentarily replace or be overlaid on the "home" page or desktop for a device, such as by placing the information on live wallpaper on the device (which may be below desktop icons for launching apps on the device). For example, the information may be displayed for an hour after the alarm sounds, and the home page or desktop may then revert to its normal format.

To illustrate how a wireless device is enabled to present information to a user, consider the example of a user who relies on the wireless device as he resides at home and as he travels. Generally, the user is enabled to invoke an alarm application that resides on the wireless device. The alarm application includes a home configuration that presents home environmental information supportive of the user as a result of determining that the user is located in a home environment. The home configuration is configured to present the information most useful to the user as he wakes up in his home. The alarm application also includes a travel configuration that presents travel environmental information supportive of the user as a result of determining that the user is located in a travel environment. The travel configuration is configured to support the user's information needs as he travels. The wireless device receives a user instruction to invoke the alarm application in a specified circumstance. For example, the user may set an alarm clock within the alarm application to wake up at 6:00 A.M. The wireless device determines a location for the user relative to the home environment and the travel environment. The location may be determined by using a GPS signal, by looking at a user's calendar (e.g., if it indicates that the user has a pair of flights surrounding a certain time period or meetings scheduled away from home on particular days) or by monitoring how the user is interfacing with the wireless phone.

In response to determining that the user is located in the home environment, the wireless device loads the home configuration. The wireless device then accesses, at the appropriate time (e.g., just before the alarm is to sound, and periodically until the display is to be removed, such as an hour after the alarm sounds) home environmental information required to present the home configuration. The home environmental information may include news, traffic and weather. In response to determining that the user is located in the travel environment, the wireless device loads the travel configuration. The wireless device accesses travel environmental information required to present the travel configuration. Accessing the travel information may include accessing flight status information, taxi dispatch information and/or setting up a communications interface so that the user can access travel services.

In response to detecting the specified circumstance, the alarm application presents the home environmental information if the home configuration has been loaded and presenting the travel environmental information if the travel configuration has been loaded. Thus, the wireless information may display commute and/or quick-glance information that the user may enjoy over a cup of coffee if the user is located at home, and may present critical travel-related information if the user is travelling.

FIG. 1 is a user interface (UI) 100 of a display for an alarm application that presents home environmental information in response to determining that a user is located in a home environment. Generally, UI 100 is used to present information responsive to a routine for a user in response to determining that the user is located in a location at or close to their home. As shown, the UI 100 include information that would likely be useful to a person when they are at home and first waking up in the morning. For example, UI 100 includes a daily calendar, a weather display, a local sports ticker, an alarm control, and a traffic map. UI 100 may be presented as part of the user's morning "wake up call." As the user wakes up, the display may be maintained for a period of time to permit the user to digest the contents of the "wake up page" presented by the alarm application.

UI 100 presents home environmental information which is designed to support the user's interests during a morning routine. UI 100 includes both mission critical information (e.g., traffic and weather information) on which the user will likely rely to prepare for the upcoming day. UI 100 also includes entertainment or leisure information (e.g., a sports ticker showing the Minnesota Twins beating the New York Yankees). Depending on a morning routine, the alarm application may be reconfigured to adjust the amount of mission critical information that is presented relative to non-critical information. In one configuration where the alarm application is relied upon by a fast-paced business executive, the alarm application may be configured to present a larger portion of mission critical information. For example, a sales executive may configure her alarm application to present the previous day's sales information in addition to traffic information and a calendar display. In another configuration where the alarm application is resident on an electronic book reader that a user enjoys during a morning coffee, the alarm application may be configured to present a larger proportion of news and sports feeds. Also, the news that is presented may be biased toward local news.

In one configuration, the elements present in UI 100 are automatically identified for the user's benefit without requiring user interaction. For example, the wireless device may be configured to interface with a host service that monitors how the user interfaces with various applications and online resources. The host then may analyze monitored information and develop a list of resources that should be presented to the user as part of the alarm application. For example, if the wireless device reports that the user visits a traffic web site, a sports web site, and a weather web site, the host then may transmit a home configuration to an alarm application on the wireless device so that the user sees the traffic web site, the sports web site, and the weather web site upon waking up. When the alarm condition (e.g., the specified time of 6:00 a.m.) occurs, the wireless device then may be configured to automatically present the resources specified in the home configuration. Alternatively or in addition, the wireless device may be configured to prompt the user to confirm that the identified resources should be presented as part of the home environmental information.

The particular resources that are shown in the home configuration may also be modified or built from scratch by the user. In particular an application accessed from the user's device or from a different device (e.g., via a web page) that is logged into an account for the user may be provided with a menu of modules that are capable of being displayed by an alarm application, and a mock display may also be shown to the user. The mock display may be populated with default modules (e.g., time and weather in the middle, and local news and other modules on the sides). The user may then drag other modules into spaces in the interface to have those modules added to the display, and may also provide parameter data for the particular modules where appropriate (e.g., identifying whether they want to see local sports scores for particular sports or particular levels of sports (e.g., professional, college, and high school). The user may then choose to save a particular home configuration and have the selected modules presented to then when an alarm is activated. Similar actions may be taken to generate a custom traveling display, described next, from a default display.

Figure 2:
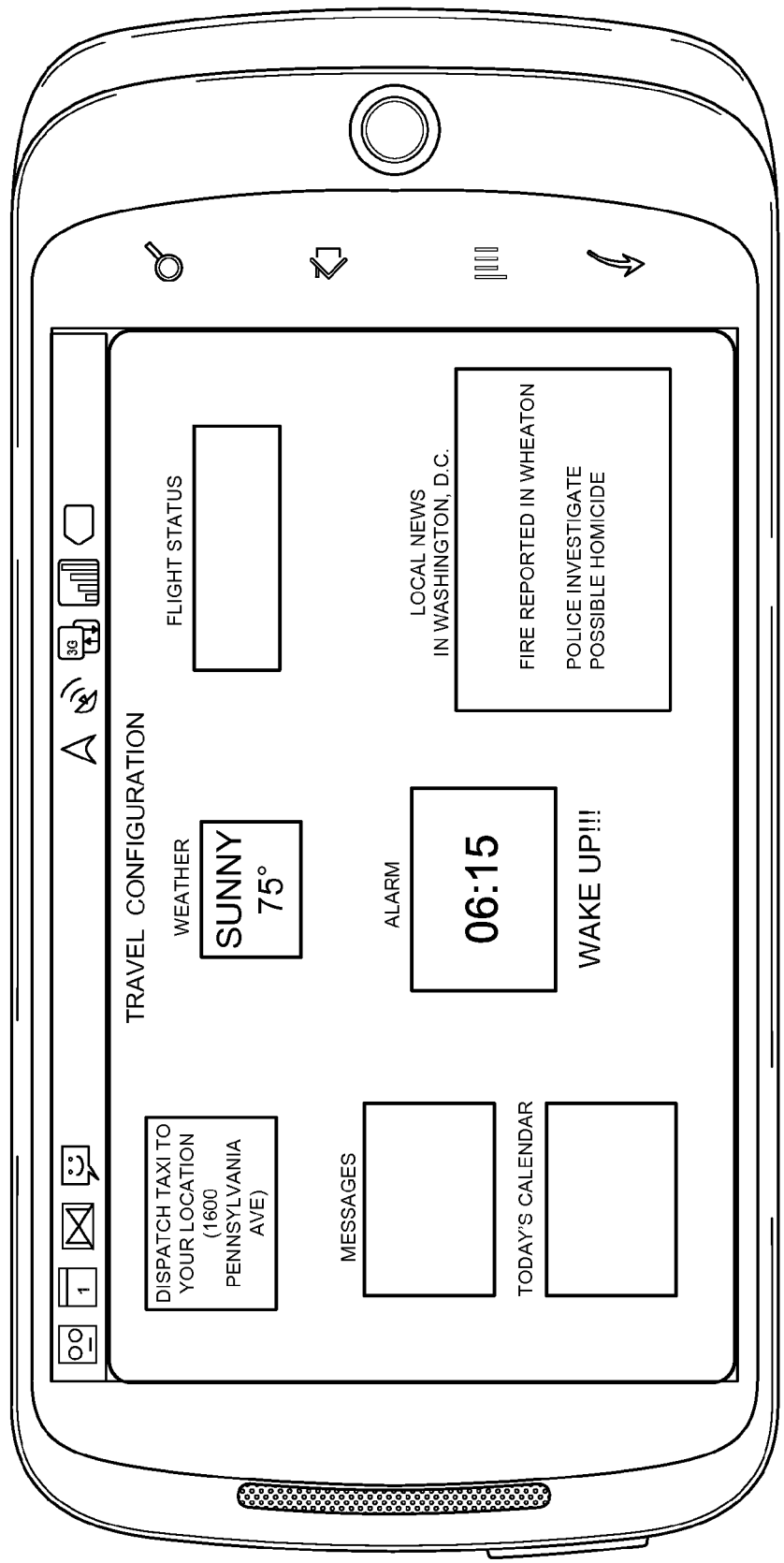
FIG. 2 is a user interface of a display for an alarm application that presents travel environmental information in response to determining that the user is located in the travel environment.

FIG. 2 is a user interface (UI) 200 of a display for an alarm application that presents travel environmental information in response to determining that a user is located in a travel environment. UI 200 is configured to present mission-critical information and interfaces that are vital to support the travel needs for a user. As shown, UI 200 includes a communications interface that can be used to dispatch a taxi service, a description of the local weather, flight status information (which may be directed to booked travel for the user), a list of messages awaiting review, an alarm control, and a list of local news for the user as the user is travelling. In addition, the display may include one or more controls for launching travel-related applications, such as a driving direction application (which the user may not need in a home configuration) that provides directions from the user's current location to the location of a meeting (which may be determined from a calendar entry for the user) or from previous visits the user has made to a particular locale. For example, if in prior trips to a particular city, the device has observed the user to spend time at particular locations (e.g., spending more than X hours at a location on more than one trip), the system may save such locations and make them available for selection by the user (e.g., selecting a pin that may be displayed on a map of the area at the particular location) for the automatic generation of driving directions to the location (which may launched a turn-by-turn navigation application).

UI 200 may be configured to present different controls that are responsive to the nature of the user's travel plans and the projected needs of the user as the user travels. For example, a user travelling several hours away on weekends to a college football game may be more interested in parking availability, local weather and traffic, in addition to sporting information. In contrast, an business executive may require access to a taxi dispatch service, flight status information, and critical work information during the initial portion of the user's morning.

Note that UI 200 includes several controls that enable the user to immediately begin communications. The taxi dispatch control may enable the user to automatically call or otherwise a taxi service from their device, and may transmit information that indicates the user's current geographic location. Upon selecting the taxi dispatch control, the user may be presented with a taxi dispatch form that confirms information related to scheduling a taxi at a specified location at a specified time. The taxi dispatch form then may be routed, translated or processed as appropriate to secure the requested service.

The UI 200 also includes an indicator that displays text to the user so that the user can see that the device is in the travel configuration, as opposed to the home configuration. In this manner, the user can readily see who the particular categories of information are being shown to the user.

In these manners, a user can be provided with information at the time an alarm goes off that is directed to the particular situation of the user at that time. The situation may be based upon geography, as a user's daily routine typically differs when he or she is traveling, as opposed to when he or she is at home or in his or her hometown. The information may be provided automatically to the user upon the ringing of the alarm, and the display of a device may later revert automatically to its normal state. As a result, a user may be provided with particularly relevant information without substantial intervention from the user.

Figure 3:
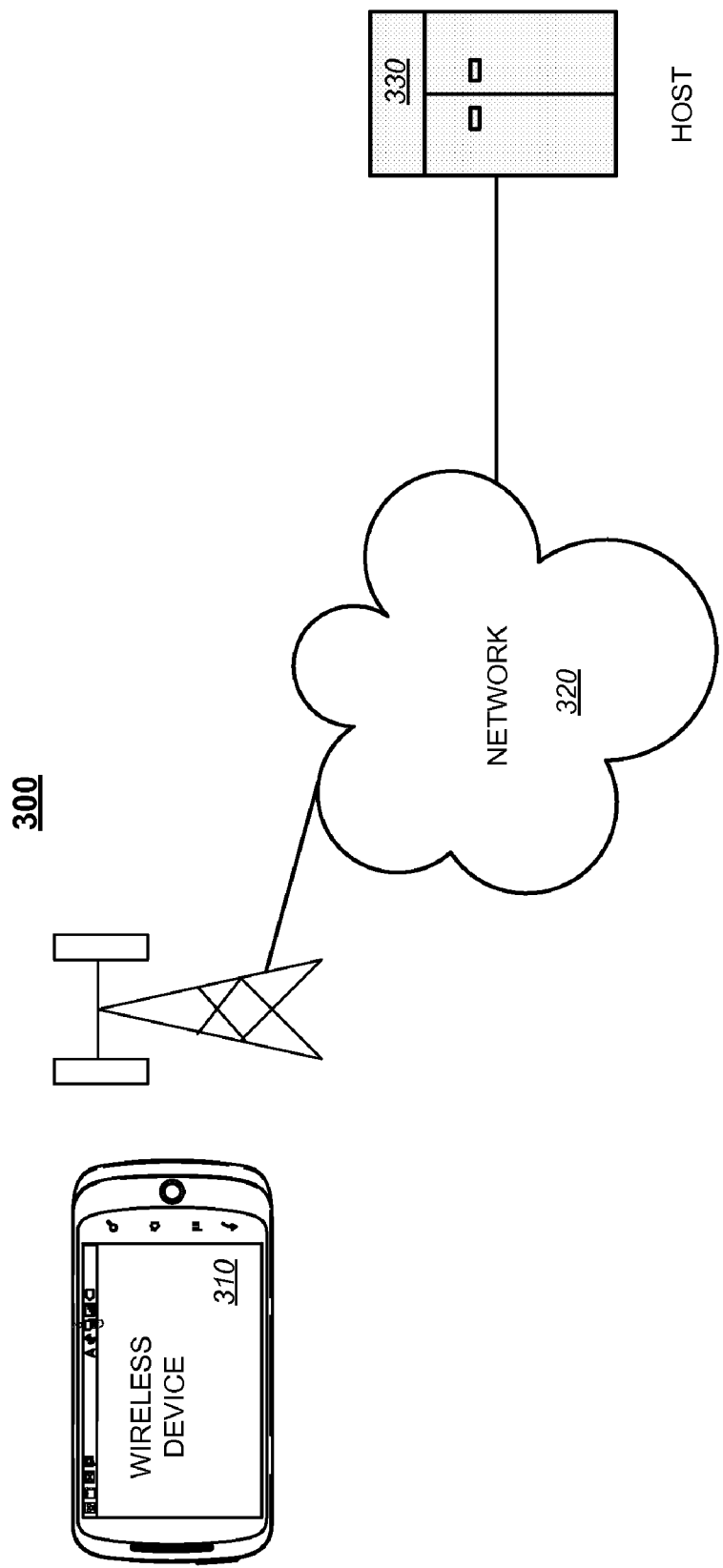
FIG. 3 is a communications system that enables a wireless device to interface with a host through a network.

FIG. 3 is a communications system 300 that enables a wireless device 310 to interface with a host 330 through a network 320. Generally, the communications system is configured to enable a wireless device 310 to interface with a host 330 to present information within an alarm application. The information may be called for by code running on the device 310, which may be triggered to execute by the current or impending sounding of the alarm, where the code, such as JavaScript code for modules on an alarm screen, is programmed to obtain information from one or more hosted services, such as traffic, weather, and news services. In obtaining the information, the modules or other code may pass information to indicate a current location of the device 310, so that the host 330 may return content that is directed to the geographic location.

The wireless device 310 typically includes a computing device that enables a user to exchange information over a communications network 320. The wireless device 310 may include one or more devices capable of accessing content residing on the host 330. The wireless device 310 may include a controller (e.g., software executing on a microprocessor) that processes instructions received from or generated by a software application, a program, a piece of code, a device, a computer, a computer system, or a combination thereof, which independently or collectively direct operations of the wireless device 310. The instructions may be embodied permanently or temporarily in any appropriate type of machine, component, equipment, or storage medium that is capable of being delivered to the wireless device 310 or that may reside with the controller at wireless device 310. Wireless device 310 may include a wireless telephone or smartphone capable of responding to and executing instructions in a defined manner, a workstation, a notebook computer, a tablet, or other computing device that is capable of responding to and executing instructions.

In one implementation, the wireless device 310 stores one or more information retrieval software applications (e.g., a browser, a mail application, an instant messaging client, an Internet service provider client, or a GMAIL or other integrated client) that are capable of receiving one or more data units. The information retrieval applications may run on a general-purpose operating system and a hardware platform that includes a general-purpose processor and specialized hardware for graphics, communications and/or other capabilities. In another implementation, wireless device 310 may include a wireless telephone running a micro-browser application on a reduced operating system with general purpose and specialized hardware capable of operating in mobile environments.

The wireless device 310 may also store an alarm application in memory that is accessible to a microprocessor for executing the instructions for the application. The alarm application enables a user to set an alarm criteria or threshold, and have an alarm generated in response to the device 310 determining that the specified circumstance has occurred. For example, the alarm application may be configured to present UI 100 in response to determining that the current time is now the specified time that the user requested to be woken up (e.g., 6:00 a.m.). In another example, the user may request to activate an alarm in response to identifying an alarm condition (e.g., a spouse receives a text message indicating that something critical has occurred). The particular UI may be controlled by a determination on the device 310 regarding the location in which the The alarm application may be configured to interface with other applications on the wireless device 310 and the host 330. For example, the alarm application may be configured to interface with an analytical engine on the host to identify which information should be provided. The alarm application then may be configured to receive one or more configurations in response that identify how the alarm application should present information to the user in response to determining that the specified circumstance has occurred. For example, the alarm application may be configured to retrieve a traffic map from a mapping server, a calendar from a wireless device calendar application, and sports headlines from a sports server.

The wireless device 310 may also include one or more media applications. For example, the wireless device 310 may include a software application that enables the wireless device 310 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. Thus, the user may wake up to an Internet radio station.

The network 320 typically includes hardware and/or software capable of enabling direct or indirect communications between the wireless device 310 and other devices in the communications system. As such, the network 320 may include a direct link between the wireless device 310 and the other devices, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 330 generally includes one or more devices, such as various forms of computer servers, configured to support the information needs of the wireless device 310. The host 330 may be configured to transmit digital content (e.g., streams of data units) from to one or more clients. The host 330 includes a communications interface to receive the digital content from a web server or to instruct the wireless device to access specified content on the other web server. The host 330 is then configured to process the digital content and enable a wireless device 310 to access the digital content. In one implementation, the host 330 also includes a management system (not shown) configured to manage one or more content serving systems and/or the digital content. For example, the management system may transmit configuration instructions to an airline host so that the wireless device 310 may access flight status information. In another example, the management system monitors user activities to develop a profile to determine whether a user is located in a home environment or a travel environment. Yet another example may feature a host 330 configured to generate display data enabling a wireless device 310 to select from one or more content options within the alarm application on the wireless device.

The host 330 may include a general purpose computer having a central processor unit (CPU), and memory/storage devices that store data and various programs such as an operating system and one or more application programs. Other examples of a host 330 includes a workstation, a server, a special purpose device or component, a broadcast system, other equipment, or some combination thereof capable of responding to and executing instructions in a defined manner. The host 330 also may include an input/output (I/O) device (e.g., video and audio input and conversion capability), and peripheral equipment such as a communications card or device (e.g., a modem or a network adapter) for exchanging data with the network 320.

The host 330 is generally capable of executing instructions under the command of a controller (not shown). The host 330 may be used to provide content to the wireless device 310. The controller may be implemented by a software application loaded on the host 330 for commanding and directing communications exchanged with the wireless device 310. Other examples of the controller include a program, a piece of code, an instruction, a device, a computer, a computer system, or a combination thereof, for independently or collectively instructing the wireless device 310 or the host 330 to interact and operate as described. The host 330 may be embodied permanently or temporarily in any type of machine, component, physical or virtual equipment, or storage medium capable of providing instructions to the host 330.

The host 330 may include a system configured to assist the wireless device 310 in managing access to the network 320. In one example, the host 130 is used to perform one or more operations or calculations that enable the wireless device 310 to content of interest. For example, the host 330 may be configured to present a graphical user interface through a web browser so that a user may navigate amongst the various content options. In another example, the host 330 is used to organization information automatically for a user's benefit without requiring the user to select different content options.

Figure 4:
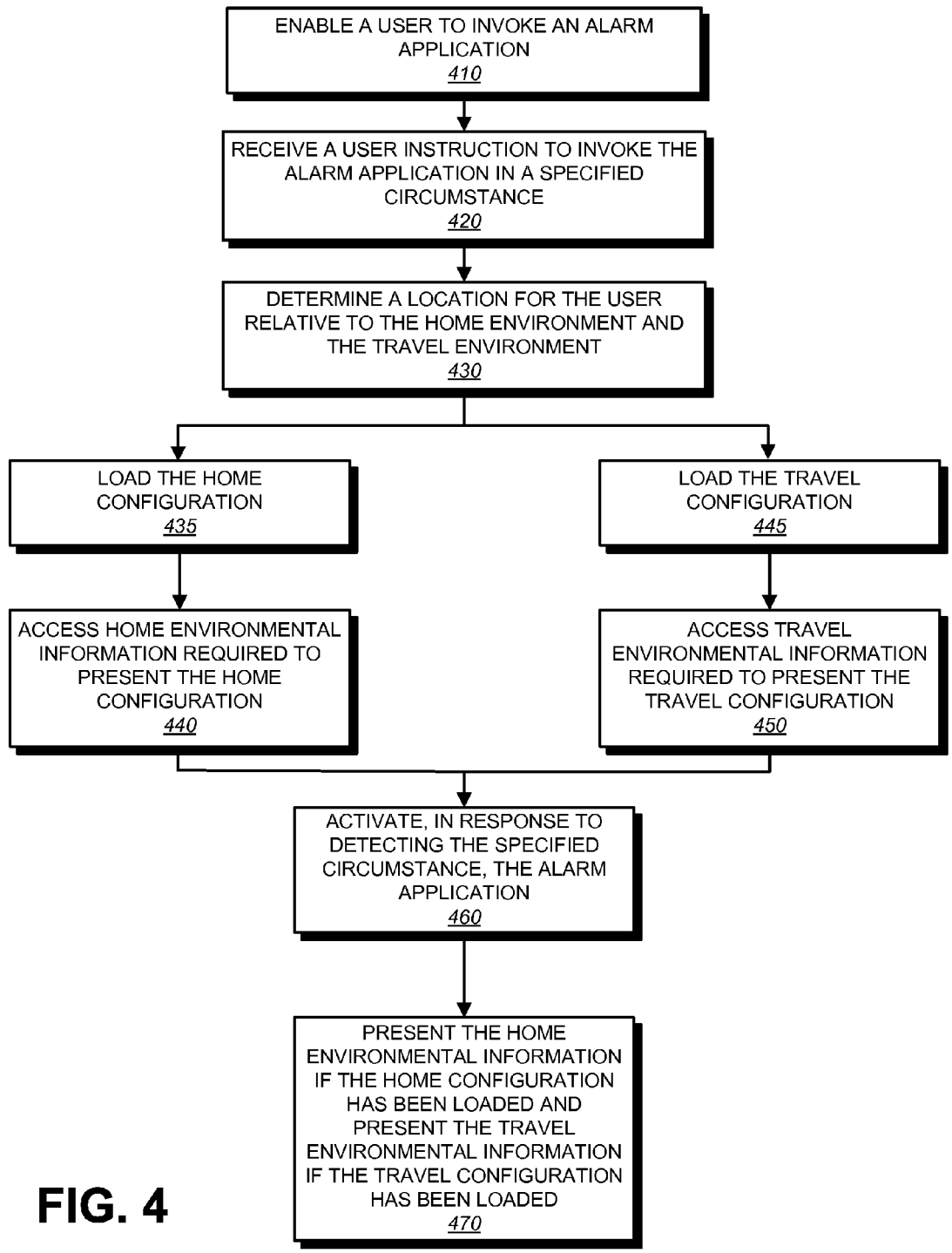
FIG. 4 is a flow chart of a process by which a wireless device to presents information to a user responsive to a determination of whether a user is located in a home environment or a travel environment.

FIG. 4 is a flow chart 400 of a process by which a wireless device to presents information to a user responsive to a determination of whether a user is located in a home environment or a travel environment. Generally, the operations described with respect to flow chart 400 are executed in order to present information to a user, such as the UIs 100 and 200 shown in FIGS. 1 and 2. However, the operations described in flow chart 400 may be used to present other displays in addition to the displays described previously.

The wireless device enables a user to invoke an alarm application (410). The alarm application generally enables a user to specify a circumstance and configure the wireless device to invoke an alarm condition upon occurrence of the alarm. The alarm application includes a home configuration that presents home environmental information supportive of the user as a result of determining that the user is located in a home environment. The home configuration information may include the information accessed most often when the user is an environment proximate to their residence. In one example, the home environmental information includes the information accessed most often during a specified time period (e.g., when the user first wakes up in the morning). The alarm application also includes a travel configuration that presents travel environmental information supportive of the user as a result of determining that the user is located in a travel environment. The travel configuration typically includes information required to support a user's travel needs, such as flight status and communications links that enable a user to establish communications with various services while the user is travelling (e.g., a taxi).

The wireless device initially receives a user instruction to invoke the alarm application in a specified circumstance (420). The user instruction may include a request to generate an alarm under a specified circumstance, such as waking up at a specified time (e.g., wake me up at 6:00 a.m.) or receiving a text from a family member in the middle of the night.

The location for the user is then determined relative to the home environment and the travel environment (430). For example, the wireless device may use a GPS system to determine if the user is residing in their primary residence or in a hotel. Alternatively or in addition, the wireless device may provide network address information to a host, which analyzes the network address information to determine a location for the user. The host then may provide the location to the wireless device or transmit an instruction to the wireless device indicating that the user is located in a home environment or a travel environment.

In response to determining that the user is located in the home environment, the wireless device loads the home configuration (435). For example, the wireless device may load a home configuration indicating that information local to the wireless device and online information in order to display home environmental information (e.g., a wakeup page) when the specified time has been reached. The wireless device then accesses home environmental information required to present the home configuration.

In response to determining that the user is located in the travel environment, the wireless device loads the travel configuration (445). The wireless device then accesses travel environmental information required to present the travel configuration. For example, travel information may be loaded that provides access to transportation and dining services.

The wireless device detects the specified circumstance, and the alarm application is activated (450), e.g., the alarm is caused to beep or buzz audibly and a display like that shown in FIGS. 1 and 2, is shown. In one configuration, the specified configuration (e.g., home configuration or travel configuration) is loaded in advance so that the wireless device may access content in the interim. This configuration may be used to avoid consuming bandwidth during high usage periods. In another configuration, the location is determined upon activation of the alarm application so that the configuration is only specified at the latest possible moment. This configuration may be used to ensure the highest degree of accuracy in determining whether the user is located in a home environment or a travel environment. The wireless device alternatively presents the home environmental information if the home configuration has been loaded and presenting the travel environmental information if the travel configuration has been loaded (470).

Figure 5:
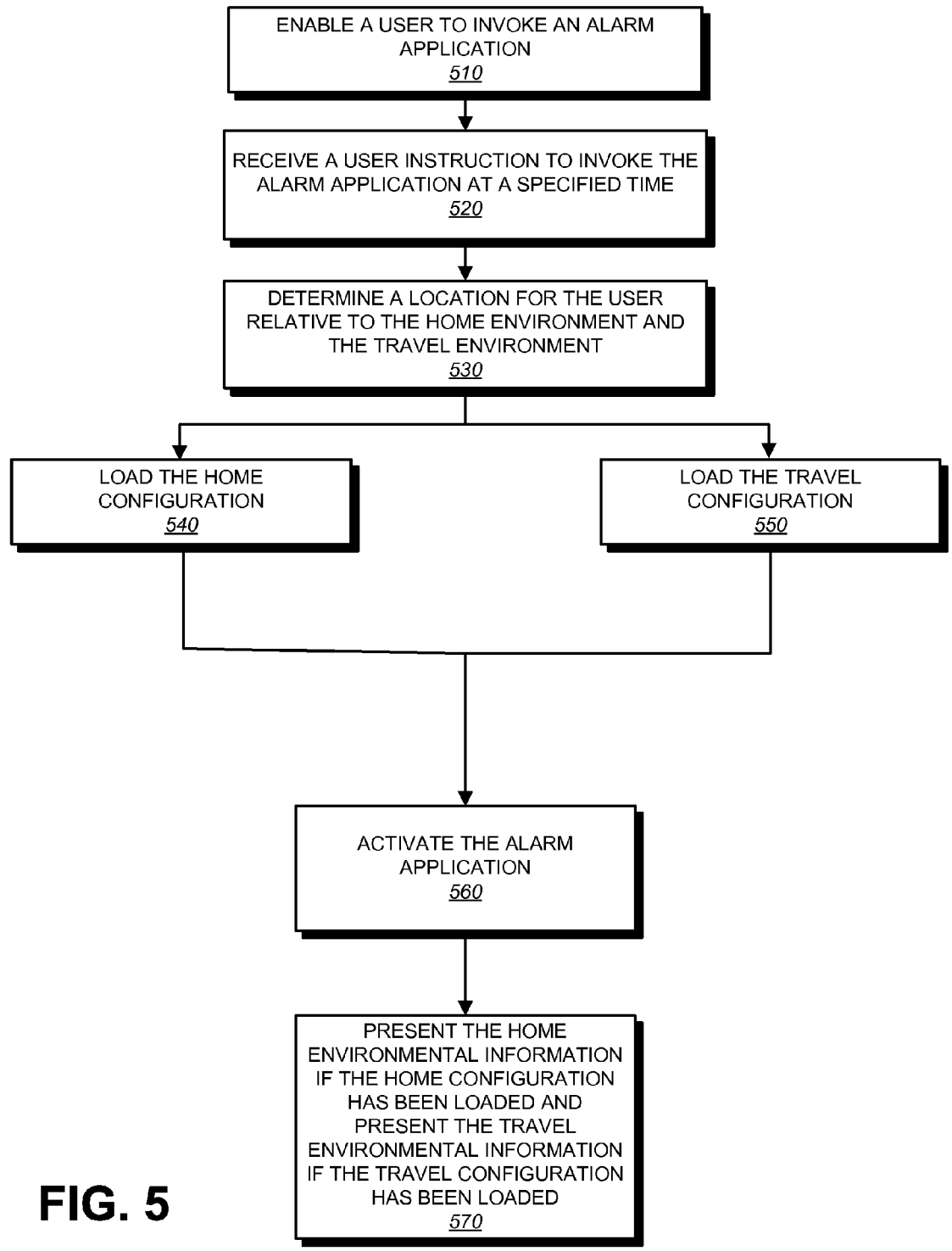
FIG. 5 is a flow chart of a process by which a wireless device to presents information to a user responsive to a determination of whether a user is located in a home environment or a travel environment.

FIG. 5 is a flow chart of a process by which a wireless device (e.g., a smartphone) presents information to a user responsive to a determination of whether a user is located in a home environment or a travel environment. Generally, the operations described with respect to flow chart 500 relate to the operations described earlier in FIG. 4. However, the operations described in flow chart 500 relate to a particular configuration that provides a more detailed example in the context of a wireless phone.

The wireless device first enables a user to invoke an alarm application (510). The alarm application may be incorporated into the operating system or the alarm application may be downloaded through an application marketplace. The alarm application includes a home configuration that presents responsive to determining that the user is closed to home. In one configuration, the user provides an address and the alarm application automatically invokes the home application in response to determining that the user is located within a geographic boundary around the address (e.g., a 25 mile radius). In another configuration, the wireless device provides current location information to a host. The host then develops a model or profile for the user's location and determines if the user is behaving as if they were close to home or if they were travelling. In yet another configuration, the host receives indications of user online activities and uses the online activities to determine whether a home configuration or a travel configuration should be used.

The wireless device then receives a user instruction to invoke the alarm application at a specified time (e.g., 6:00 a.m.) (520). The wireless device can then determine a location for the user relative to the home environment and the travel environment (530). For example, if the user is residing within a specified boundary for the home environment, the wireless device may determine that the home configuration should be used. In contrast, if the user is beyond the specified boundary, the wireless device may determine that a travel configuration should be used.

In response to determining that the user is located in the home environment, the wireless device loads the home configuration (540). The home configuration may include a traffic resource and a weather site in addition to a list of recent messages. The wireless device accesses home environmental information required to present the home configuration. For example, the wireless device may go online at 5:55 a.m. and download the specified information so that it is available for presentation at 6:00 a.m.

Alternatively, in response to determining that the wireless device is located in the travel environment, the wireless device loads the travel configuration (550). The travel information may include information previously accessed by the user during activities for which a host later determined that the user was travelling. The wireless phone then accesses travel environmental information required to present the travel configuration. The travel environmental information may include a train schedule, a list of currency exchanges and a list of travel alerts.

Irrespective of which configuration has been loaded, the wireless device activates, the alarm application in response to determining that the local time is now 6:00 a.m. (560). The alarm application may include activating a lighting sequence and audio signal configured to inspire user activity. For example, the wireless phone may play a police siren until the alarm has been silenced. The wireless phone presents the home environmental information if the home configuration has been loaded and presenting the travel environmental information if the travel configuration has been loaded (570). The wireless phone may include "fumbling" mode for a period of several minutes after the alarm so that as a semi-awake user reaches to silence the alarm, the user is still able to perceive the home environmental information or the travel environmental information. In one configuration, the "fumbling" mode may be preserved for a period of time, (e.g., 2 minutes) after first detecting movement. In another configuration, the "fumbling" mode is preserved until the user is able to complete a more complex challenge and response routine designed to ensure that the user actually intends to depart from the current display on the wireless device. For example, the user may be asked to enter a short PIN code or sequentially select highlighted portions of the screen.

Figure 6:
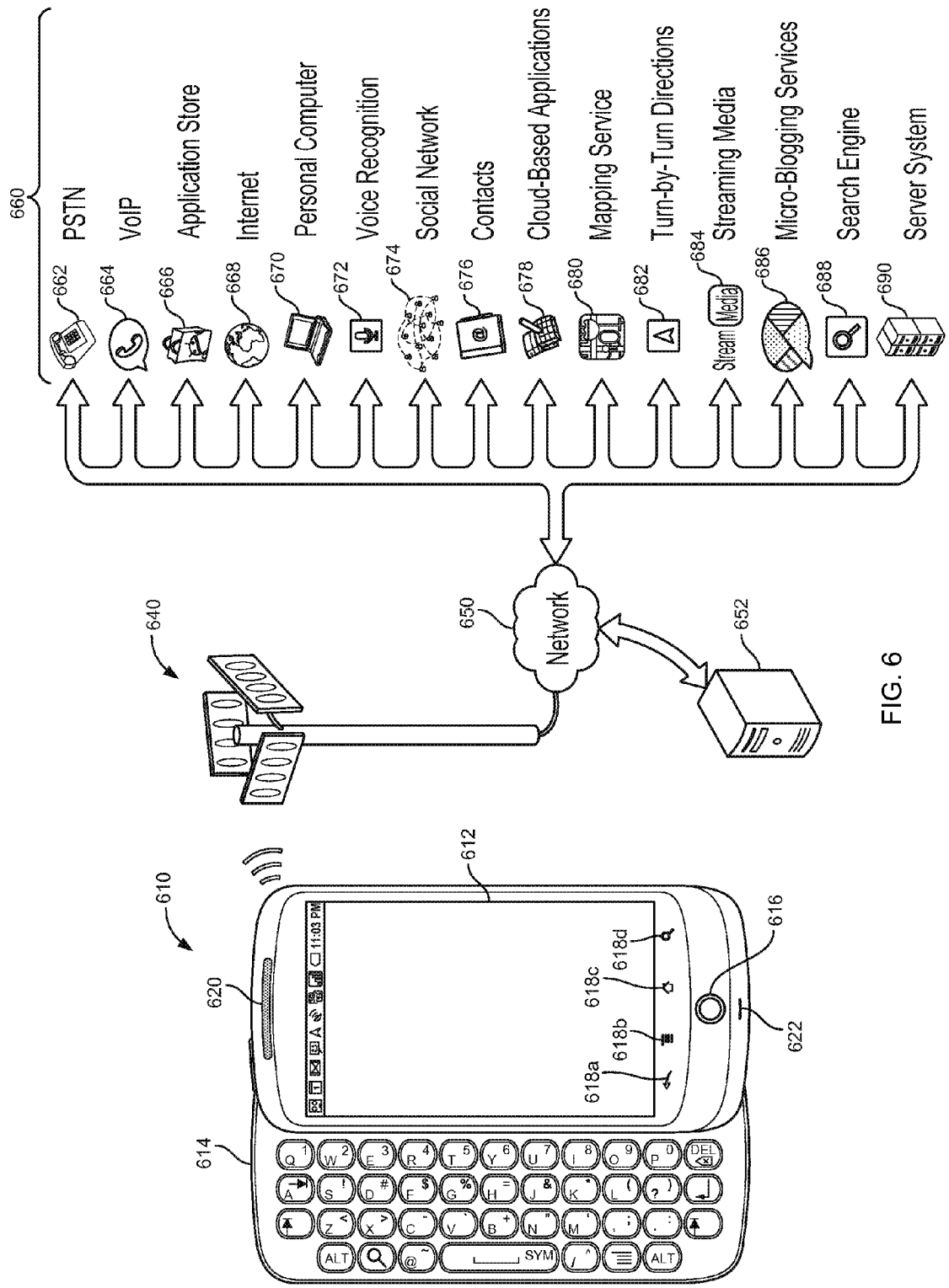
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
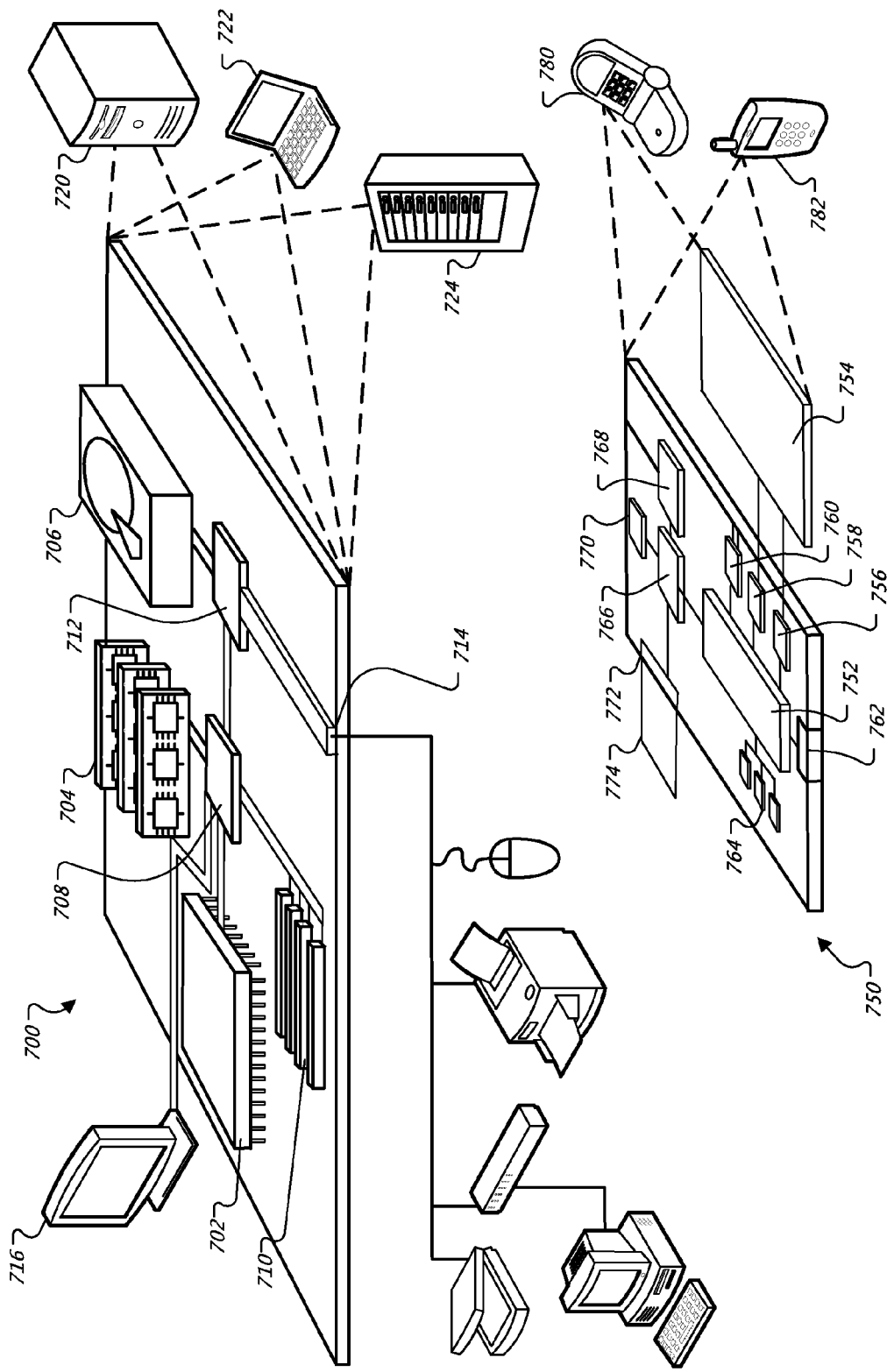
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 77. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although the application has been discussed in the context of using an alarm application to invoke a home and a travel configuration, other configurations may be used. For example, a user may invoke an afternoon or evening configuration that provides information responsive to the evening ahead, such as the commute home and/or tasks required to be completed before the end of the business day. Other implementations are within the scope of the following claims.

What is claimed is:

1. A method for presenting information to a user of a mobile computing device, the method comprising:
    enabling a user to invoke an alarm application that includes (a) a home configuration that presents home environmental information supportive of the user as a result of determining that the user is located in a home environment, and (b) a travel configuration that presents travel environmental information supportive of the user as a result of determining that the user is located in a travel environment;
    receiving a user instruction to invoke the alarm application at a specified time;
    determining whether the user is located in the home environment or the travel environment, including by monitoring inputs by the user to the device other than inputs that explicitly identify the home environment or travel environment, to determine inputs that are indicative of the home environment or the travel environment;
    based on determining whether the user is located in the home environment or the travel environment, and at a time in advance of the specified time:
        loading the home configuration, and accessing home environmental information required to present the home configuration, or
        loading the travel configuration, and accessing travel environmental information required to present the travel configuration;
    activating the alarm application automatically in response to determining that a current time is the specified time and
    presenting the home environmental information if the home configuration has been loaded, or the travel environmental information if the travel configuration has been loaded.

2. The method of claim 1, wherein determining inputs that are indicative of the home environment or the travel environment includes determining whether the user is requesting previously-accessed information determined to be associated with the home environment or the travel environment.

3. The method of claim 1, wherein determining inputs that are indicative of the home environment or the travel environment includes determining whether the user is requesting not-previously-accessed information determined to be associated with a new location that is different than the home location.

4. The method of claim 1, wherein determining whether the user is located in the home environment or the travel environment includes:
    using a global positioning system receiver or a network address to determine a geographic location for the mobile computing device;
    comparing the determined geographic location relative to prior travel patterns; and
    determining, based on the comparison of the location relative to prior travel patterns, whether the user is located in the home environment or the travel environment.

5. The method of claim 1, wherein accessing home environmental information required to present the home configuration includes:
    monitoring user interaction with the wireless device;
    identifying, based on monitoring user interaction with wireless device, home environmental information determined to be useful when activating the alarm application in the home configuration; and
    prompting the user to confirm that the home environmental information should be presented when activating the alarm application.

6. The method of claim 1, wherein accessing home environmental information required to present the home configuration includes:
    monitoring user interaction with the wireless device;
    identifying, based on monitoring user interaction with wireless device, the home environmental information determined to be useful when activating the alarm application in the home configuration; and
    modifying the home configuration to automatically include the home environmental information without prompting the user.

7. The method of claim 1, wherein presenting the home environmental information includes presenting traffic information for a commuter route for the user from a home of the user to a workplace of the user.

8. The method of claim 1, wherein presenting the travel environmental information includes presenting airline flight information for the user.

9. The method of claim 1, further including:
updating the home environmental information, if the home configuration is determined to have been loaded, by periodically accessing the home environmental information, or
updating the travel environmental information, if the travel configuration is determined to have been loaded, by periodically accessing the travel environmental information.

10. A method for presenting information to a user of a mobile computing device, the method comprising:
determining that an alarm should be presented on the mobile computing device at a specified time;
determining a location of the mobile computing device, including by monitoring inputs by the user to the device other than inputs that explicitly identify a home environment or a travel environment, to determine inputs that are indicative of the home environment or the travel environment;
selecting an alarm configuration based on the determination of the location of the mobile computing device;
at a time in advance of the specified time, accessing environmental information with the mobile computing device and based on the location of the mobile computing device; and
in response to determining that a current time is the specified time, causing the alarm to be presented by displaying the accessed environmental information.

11. The method of claim 10, wherein the specified time is dependent on the location of the mobile computing device.

12. The method of claim 10, wherein causing the alarm to be presented comprises causing a plurality of modules to be displayed, the plurality of modules having been selected by the user to correspond to the selected alarm configuration.

13. The method of claim 10, wherein determining the location of the mobile computing device comprises comparing a current geographic location of the mobile computing device to a location at which the mobile computing device has been determined to be most frequently located.

14. The method of claim 10, wherein causing the alarm to be presented comprises obtaining from a hosted computer service remote from the mobile computing device, real-time data that represents a current condition in a geographic area around the mobile computing device.

15. A tangible non-transitory recordable storage medium having recorded therein instructions, that when executed, perform actions comprising:
determining that an alarm should be presented on the mobile computing device at a specified time;
determining a location of the mobile computing device, including by monitoring inputs by the user to the device other than inputs that explicitly identify a home environment or a travel environment, to determine inputs that are indicative of the home environment or the travel environment;
selecting an alarm configuration based on the determination of the location of the mobile computing device;
at a time in advance of the specified time, accessing environmental information with the mobile computing device and based on the location of the mobile computing device; and
in response to determining that the current time is the specified time, causing the alarm to be presented by displaying the accessed environmental information.

16. The tangible non-transitory recordable storage medium of claim 15, wherein the specified time is dependent on the location of the mobile computing device.

17. The tangible non-transitory recordable storage medium of claim 15, wherein causing the alarm to be presented comprises causing a plurality of modules to be displayed, the plurality of modules having been selected by the user to correspond to the selected alarm configuration.

18. The tangible non-transitory recordable storage medium of claim 15, wherein determining the location of the mobile computing device comprises comparing a current geographic location of the mobile computing device to a location at which the mobile computing device has been determined to be most frequently located.

19. The tangible non-transitory recordable storage medium of claim 15, wherein causing the alarm to be presented comprises obtaining from a hosted computer service remote from the mobile computing device, real-time data that represents a current condition in a geographic area around the mobile computing device.

* * * * *